United States Patent [19]

Ovshinsky et al.

[11] Patent Number: 5,554,456
[45] Date of Patent: Sep. 10, 1996

[54] ELECTROCHEMICAL HYDROGEN STORAGE ALLOYS AND BATTERIES CONTAINING HETEROGENEOUS POWDER PARTICLES

[75] Inventors: Stanford R. Ovshinsky, Bloomfield Hills; Michael A. Fetcenko, Rochester Hills; Jun Im, Sterling Heights; Benjamin Chao, Troy; Benjamin Reichman, West Bloomfield; Kwo Young, Troy, all of Mich.

[73] Assignee: Ovonic Battery Company, Inc., Troy, Mich.

[21] Appl. No.: 436,674

[22] Filed: May 8, 1995

Related U.S. Application Data

[63] Continuation-in-part of Ser. No. 259,793, Jun. 14, 1994, Pat. No. 5,506,069, Ser. No. 436,673, Apr. 27, 1995, and Ser. No. 423,072, Apr. 17, 1995.

[51] Int. Cl.$^6$ ................................................. H01M 4/38
[52] U.S. Cl. .......................... 429/59; 429/101; 252/514; 420/900; 427/123; 428/558
[58] Field of Search ...................... 429/59, 101; 420/900; 427/123, 217; 252/514; 204/292, 293; 428/557, 558; H01M 4/38, 10/34

[56] References Cited

U.S. PATENT DOCUMENTS

| | | | |
|---|---|---|---|
| 4,451,445 | 5/1984 | Cheng et al. | 420/900 X |
| 4,582,117 | 4/1986 | Kushnick | 164/463 |
| 4,589,919 | 5/1986 | Goodell et al. | 420/900 X |
| 4,623,597 | 11/1986 | Sapru et al. | 429/101 |
| 4,789,022 | 12/1988 | Ohno | 164/463 |
| 4,818,567 | 4/1989 | Kemp et al. | 427/217 X |
| 5,198,207 | 3/1993 | Knott et al. | 423/647 |
| 5,407,761 | 4/1995 | Ovshinsky et al. | 429/59 |
| 5,451,474 | 9/1995 | Wu et al. | 429/101 X |

FOREIGN PATENT DOCUMENTS

| | | | |
|---|---|---|---|
| 61-51760 | 3/1986 | Japan | H01M 4/38 |
| 61-199045 | 9/1986 | Japan | 420/900 |
| 1-132049 | 5/1989 | Japan | H01M 4/38 |

*Primary Examiner*—Stephen Kalafut
*Attorney, Agent, or Firm*—Marc J. Luddy; Marvin S. Siskind; David W. Schumaker

[57] ABSTRACT

Non-uniform heterogeneous powder particles for electrochemical uses, and said powder particles comprising at least two separate and distinct hydrogen storage alloys selected from the group consisting of: Ovonic LaNi$_5$ type alloys, Ovonic TiNi type alloys, and Ovonic MgNi based alloys.

34 Claims, No Drawings

ELECTROCHEMICAL HYDROGEN STORAGE ALLOYS AND BATTERIES CONTAINING HETEROGENEOUS POWDER PARTICLES

This application is a continuation-in part U.S. patent application Ser. No. 08/259,739 filed 14 Jun. 1994, now U.S. Pat. No. 5,556,069 titled ELECTROCHEMICAL HYDROGEN STORAGE ALLOYS AND BATTERIES FABRICATED FROM Mg CONTAINING BASE ALLOYS; U.S. patent application Ser. No. 08/436,673 filed 27 Apr. 1995, titled ELECTROMCHEMICAL HYDROGEN STORAGE ALLOYS AND BATTERIES FABRICATED FROM MG CONTAINING BASE ALLOYS; and U.S. patent application Ser. No. 08/432,072 filed 17 Apr. 1995, titled IMPROVED ELECTROCHEMICAL HYDROGEN STORAGE ALLOYS FOR NICKEL METAL HYDRIDE BATTERIES.

FIELD OF THE INVENTION

The present invention relates to electrochemical hydrogen storage alloys and rechargeable electrochemical cells using heterogeneous alloys, More particularly, the invention relates to nickel metal hydride (Ni—MH) rechargeable cells and batteries having negative electrodes formed of heterogeneous alloys. Such alloys are formed from a heterogeneous combination of MgNi based electrochemical hydrogen storage alloys and other types of "Ovonic" (as defined hereinafter) hydrogen storage alloy materials. The heterogeneous formulation can take the form of encapsulation and/or heterogeneous mixing of different alloys to provide enhanced electrochemical performance characteristics. In addition to lower cost, cells that incorporate the alloys of the invention have performance characteristics that are as good as or better than known rechargeable cells using hydrogen storage alloys such as cycle life, charge retention, low temperature, energy density, and especially dramatic increases in electrochemical storage capacity. Another embodiment of the invention focusses on the particular fabrication and characterization of the chemically and structurally modified MgNi alloys to provide remarkable improvements in electrochemical performance in particular hydrogen storage capacity.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as portable computer, video cameras, and cellular phones. They are often configured into a sealed power pack that is designed as an integral part of a specific device. Rechargeable alkaline cells can also be configured as larger cells that can be used, for example, in industrial, aerospace, and electric vehicle applications.

For more than three decades, virtually every battery manufacturer in the world studied the NiMH battery technology, but no commercial battery of this kind existed until after the publication of U.S. Pat. No. 4,623,597 to Sapru, Reger, Reichman, and Ovshinsky which disclosed Ovshinsky's basic and fundamentally new principles of battery material design. Stanford R. Ovshinsky was responsible for inventing new and fundamentally different electrochemical electrode materials. As predicted by Ovshinsky, reliance on simple, relatively pure compounds was a major shortcoming of the prior art. Relatively pure crystalline compounds were shown to have a low density of hydrogen storage sites, and the type of active sites available occurred accidently and were not designed into the bulk of the material. Thus, the efficiency of the storage of hydrogen and the subsequent release of hydrogen to form water was determined to be poor. By applying his fundamental principles of disorder to electrochemical hydrogen storage, Ovshinsky drastically departed from conventional scientific thinking and created a disordered material having an ordered local environment where the entire bulk of the material was provided with catalytically active hydrogen storage sites as well as other sites which provided the required thermodynamic absorption and release necessary for electrochemical activity.

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent disclosed that disordered materials do not require any periodic local order and how spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials, The elements of these materials offer a variety of bonding possibilities due to the multidirectionality of d-orbitals. The multidirectionality ("porcupine effect") of d-orbitals provides for a tremendous increase in density and hence active storage sites. These techniques result in means of synthesizing new materials which are disordered in several different senses simultaneously.

Ovshinsky had previously shown that the number of surface sites could be significantly increased by making an amorphous film in which the bulk thereof resembled the surface of the desired relatively pure materials. Ovshinsky also utilized multiple elements to provide additional bonding and local environmental order which allowed the material to attain the required electrochemical characteristics. As Ovshinsky explained in *Principles and Applications of Amorphicity, Structural Change*, and *Optical Information Encoding*, 42 Journal De Physique at C4-1096 (Octobre 1981):

Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . .

Once amorphicity was understood as a means of introducing surface sites in a film, it was possible to produce "disorder" that takes into account the entire spectrum of effects such as porosity, topology, crystallites, characteristics of sites, and distances between sites. Thus, rather than searching for material changes that would yield ordered materials having a maximum number of accidently occurring surface bonding and surface irregularities, Ovshinsky and his team at ECD began constructing "disordered" materials where the desired irregularities were tailor made. See, U.S. Pat. No. 4,623,597, the disclosure of which is incorporated by reference.

The term "disordered", as used herein to refer to electrochemical electrode materials, corresponds to the meaning of the term as used in the literature, such as the following:

A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . . . S. R. Ovshinsky, *The Shape of Disorder,* 32 *Journal of Non-Crystalline Solids* at 22 (1979) (emphasis added).

The "short-range order" of these disordered materials are further explained by Ovshinsky in *The Chemical Basis of Amorphicity: Structure and Function,* 26:8–9 *Rev. Roum. Phys.* at 893–903 (1981): [S]hort-range order is not conserved . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Based on these principles of disordered materials, described above, three families of extremely efficient electrochemical hydrogen storage negative electrode materials were formulated. These families of negative electrode materials, individually and collectively, will be referred to hereinafter as "Ovonic." One of the families is the La-Nis-type negative electrode materials which have recently been heavily modified through the addition of rare earth elements such as Ce, Pr, and Nd and other metals such as Mn, Al, and Co to become disordered multicomponent alloys, i.e., "Ovonic". The second of these families is the Ti—Ni—type negative electrode materials which were introduced and developed by the assignee of the subject invention and have been heavily modified through the addition of transition metals such as Zr and V and other metallic modifier elements such as Mn, Cr, Al, Fe, etc. to be disordered, multi-component alloys, i.e., "Ovonic." The third of these families are the disordered, multicomponent MgNi-type negative electrode materials described herein.

Based on the principles expressed in Ovshinsky's '597 Patent, the Ovonic Ti—V—Zr—Ni type active materials are disclosed in U.S. Pat. No. 4,551,400 to Sapru, Fetcenko, et al. ("the '400 Patent"), the disclosure of which is incorporated by reference. This second family of Ovonic materials reversibly form hydrides in order to store hydrogen. All the materials used in the '400 Patent utilize a Ti—V—Ni composition, where at least Ti, V, and Ni are present with at least one or more of Cr, Zr, and Al. The materials of the '400 Patent are generally multiphase polycrystalline materials, which may contain, but are not limited to, one or more phases of Ti—V—Zr—Ni material with $C_{14}$ and $C_{15}$ type crystal structures. Other Ovonic Ti—V—Zr—Ni alloys are described in commonly assigned U.S. Pat. No. 4,728,586 ("the '586 Patent"), titled *Enhanced Charge Retention Electrochemical Hydrogen Storage Alloys and an Enhanced Charge Retention Electrochemical Cell,* the disclosure of which is incorporated by reference.

The characteristic surface roughness of the metal electrolyte interface is a result of the disordered nature of the material as disclosed in commonly assigned U.S. Pat. No. 4,716,088 to Reichman, Venkatesan, Fetcenko, Jeffries, Stahl, and Bennet, the disclosure of which is incorporated by reference. Since all of the constituent elements, as well as many alloys and phases thereof, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are important in determining its macroscopic electrochemical characteristics.

In addition to the physical nature of its roughened surface, it has been observed that V—Ti—Zr—Ni type alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface has a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel— interacts with metal hydride alloys in catalyzing the electrochemical charge and discharge reaction steps, as well as promoting fast gas recombination.

Despite the exceptional electrochemical performance now provided by Ovonic, highly disordered nickel metal hydride systems (twice the hydrogen storage capacity of NiCd systems), consumers are demanding increasingly greater run times and vower requirements from such rechargeable battery systems. No current battery system can meet these ever-increasing demands. Accordingly, there exists a need for an ultra high capacity, long charge retention, high power delivery, long cycle life, reasonably priced rechargeable battery system.

SUMMARY OF THE INVENTION

One aspect of the present invention is to provide non-uniform heterogeneous powder particles for the negative electrode of electrochemical cells, such powder particles comprising at least two separate and distinct hydrogen storage alloys. These powder particles will include at least two separate and distinct component alloy systems which can be distinguished by their respective microstructure and preferably either be layered or encapsulating.

Another aspect of the present invention is a method of making powder particles for electrochemical hydrogen storage comprising the steps of: forming a first Ovonic alloy component by mixing and melting wherein said alloy has the following compositions: $(Mg_xNi_{1-x})_aM_b$ where, M represents at least one modifier element chosen from the group consisting of Ni, Co, Mn, Al, Fe, Cu, Mo, W, Cr, V, Ti, Zr, Sn, Th, Si, Zn, Li, Cd, Na, Pb, La, Mm, Pd, Pt, and Ca: b ranges from 0 to less than 30 atomic percent; a+b=100 atomic percent of said first component material; $25<x<75$; and forming a second component comprising at least one element chosen from the group consisting of: Ti in the amount of 0 to 60 atomic percent; Zr in the amount of 0 to 40 atomic percent; V in the amount of 0 to 60 atomic percent; Ni in the amount of 0 to 57 atomic percent; Cr in the amount of 0 to 56 atomic percent; Cu in the amount of 0 to 56 atomic percent; Co in the amount of 0 to 15 atomic percent; Mn in the amount of 0 to 20 atomic percent; Al in the amount of 0 to 20 atomic percent; Fe in the amount of 0 to 10 atomic percent; Mo in the amount of 0 to 8 atom percent; La in the amount of 0 to 30 atomic percent; and Mm in the amount of 0 to 30 atomic percent; where the total amount of the at least one modifier element is equal to 100 atomic percent of the second component material; encapsulating said first component with the second component using a method chosen from a group consisting of melt spinning, gas atomization, ultrasonic atomization, centrifugal atomization, planar flow casting, plasma spray, mechanical alloying, chemical vapor deposition, physical vapor deposition, and chemical deposition.

Preferably, the second component comprises an Ovonic, i.e., disordered multicomponent material comprising the following elements: Ti in the amount of 0.1 to 60 atomic percent; Zr in the amount of 0.1 to 40 atomic percent; V in the amount of 0 to 60 atomic percent; Ni in the amount of 0.1 to 57 atomic percent; Cr in the amount of 0 to 56 atomic percent; Co in the amount of 0 to 15 atomic percent; Mn in the amount of 0 to 20 atomic percent; Al in the amount of 0 to 8 atomic percent; Fe in the amount of 0 to 6 atomic percent; Mo in the amount of 0 to 10 atomic percent; La in the amount of 0 to 30 atomic percent; and Mm in the amount of 0 to 30 atomic percent; where the total amount of the elements is equal to 100 atomic percent of the second component.

Another aspect of the present invention is a method of making powder particles where the first component and the second component, as described above, are mechanically mixed.

Yet another aspect of the present invention is a powder particle active material for a nickel metal hydride negative electrode comprising a composite material formed from at least two members selected from the group consisting of Ovonic LaNi$_5$ type alloys, Ovonic TiNi type alloys, and Mg based Ovonic alloys.

Another aspect of the present invention is powder particles that comprise a first component alloy and a second component where the first component comprises materials having the following composition: $(Mg_xNi_{1-x})_aM_b$ where, M represents at least one modifier element chosen from the group consisting of Ni, Co, Mn, Al, Fe, Cu, Mo, W, Cr, V, Ti, Zr, Sn, Th, Si, Zn, Li, Cd, Na, Pb, La, Mm, Pd, Pt, and Ca; b ranges from 0 to less than 30 atomic percent; and a+b=100 atomic percent of said first component; $25 \leq x \leq 75$; and the second component comprises at least one element chosen from the group consisting of: Ti in the amount of 0 to 60 atomic percent; Zr in the amount of 0 to 40 atomic percent; V in the amount of 0 to 60 atomic percent; Ni in the amount of 0 to 57 atomic percent; Cr in the amount of 0 to 56 atomic percent; Cu in the amount of 0 to 56 atomic percent; Co in the amount of 0 to 15 atomic percent; Mn in the amount of 0 to 20 atomic percent; Al in the amount of 0 to 20 atomic percent; Fe in the amount of 0 to 10 atomic percent; Mo in the amount of 0 to 8 atomic percent; La in the amount of 0 to 30 atomic percent; and Mm in the amount of 0 to 30 atomic percent; where the total amount of said elements is equal to 100 atomic percent of the second component. In one preferred embodiment, these powder particles are blended composites that exhibit a preferential distribution of the second component on their outer surface thereof.

The present invention also includes electrochemical hydrogen storage cells having a negative electrode formed from the heterogeneous powder particles described, above.

DETAILED DESCRIPTION OF THE INVENTION

As a result of their experience gained from developing metal hydride negative electrode materials, Ovshinsky and his team have discovered a variety of improved materials for battery electrodes formed of non-uniform heterogeneous powder particles. These powder particles comprise at least two separate and distinct hydrogen storage alloys. The chosen hydrogen storage alloy components can be any combination of crystalline single or multiple phase hydrogen storage alloys or Ovonic hydrogen storage alloys.

More specifically, the hydrogen storage components can be any combination of electrochemical hydrogen storage alloys such as those alloys classified as Ovonic, TiVZrNi type alloys, Ovonic LaNi$_5$ type alloys, or Ovonic MgNi based alloys (such as described in U.S. patent application Ser. Nos. 08/259,793 and 08/436,674. The present application is a continuation-in-part of both of these applications, and the contents of both of these applications are specifically incorporated by reference.

The present invention describes alloys that are uniquely formulated to take advantage of the outstanding properties of each of the constituent hydrogen storage component alloys and to avoid any detrimental qualities of these alloys.

An aspect of the present invention, discussed briefly in copending U.S. patent application Ser. No. 08/420,072, involves a new model for understanding the surface properties of negative electrode materials. One important consideration in formulating the alloys of the present invention involves that the proper balance of corrosion and passivation characteristics exists. Reaching such a balance begins with viewing metal hydride negative electrode materials as having a continuum of passivation and corrosive properties, such as shown in Table 1, below.

TABLE 1

PASSIVATION/CORROSION PROPERTIES

| highly passivating / / / | / / / //////// / / / | / / / highly corrosive |
| --- | --- | --- |
|  | <operative window> |  |
| La, Mg | Zr, Mn, Cr, Fe, Ti | V, W, Mo |

With this knowledge, it is possible to formulate combinations of elements to produce electrode materials that will consequently have a proper balance of corrosion and passivation characteristics and fall within the "operative window" for a particular alloy. Ovonic TiNi type alloys have been optimized for such a balance (see, for example U.S. Pat. Nos. 5,238,756 and 5,277,999, discussed above). Similarly, the production of Ovonic LaNi$_5$ type electrode materials required the introduction of modifiers to contribute corrosive properties and move these generally passivating alloys into the "operative window." (The term "operative window" is used to refer to the range of passivating and corrosion properties of negative electrode materials which provide for commercially acceptable electrochemical performance characteristics such as cycle life, power, etc.) This operative window is unique for every metal hydride alloy. Table 2 below lists modifier groups I, II, III and IV that address a number of elemental modifications possible in the MGNi based alloys of the present invention.

TABLE 2

| I | II | III | IV |
| --- | --- | --- | --- |
| Ca | V | B | Cu |
| Be | Ti | Bi | Th |
| Y | Zr | In | Si |
|  | Cr | Sb | Zn |
|  | Al |  | Li |
|  | Fe |  | La |
|  | Sn |  | Mm |
|  |  |  | F |

In general, when added as modifiers the elements described in Table 2 make the following contributions to the final alloy mixture: Group I, Ca, Be, and Y can partially substitute for Mg. For instance, we expect that the substitution of an element like Ca for perhaps a small portion of the Mg will increase chemical disorder without significantly reducing the hydrogen storage capacity.

Group II elements permit the custom engineering of metal hydrogen bond strength, activation characteristics, and surface oxide characteristics. The choice of which element or elements in the group will have which specific effect is dependent on the other component elements for a particular Ovonic MgNi based alloy. In general, the effect of the Group II elements are closely interrelated. For example, Ovonic MgNi alloys yield significantly enhanced performance and exceptional bulk material capacity, but they still tend to passivate which indicates that further optimization is necessary to bring them more completely into the operative window. The inventors have shown that optimization of these alloys begins by imparting additional corrosion characteristics to the alloy surface. Such a course adjustment with MgNiCoMn alloys is achieved through the addition of corrosive elements such as V and Al. One can think of the addition of V and Al as useful for the course adjustment of corrosion/passivation properties. Fine adjustment in these MgNiCoMn alloys is achieved through the addition of elements such as Cr, Zr, Fe, Sn, Si, and Cu which can be used in combinations to achieve the correct balance between corrosion and passivation while maintaining good catalysis and metal hydrogen bond strength.

The elements in Group III, B, Bi, Sb and In are considered glass formers that effect the formation of crystalline lattices. As stated previously, Ovonic MgNiCoMn alloys have an improved tendency to avoid phase segregation during solidification. It may be possible to completely eliminate phase segregation through processing variations such as faster cooling rates and more careful control of ribbon thickness. Another approach is to provide a base alloy that has an improved resistance to phase segregation. The addition of Group III elements may assist in this regard. The introduction of B, for example, into the lattice network will eliminate or reduce the size of the crystal lattice networks of the material.

Finally, the Group IV elements affect metallurgical properties of the base alloy, particularly disorder, density of state, hardness, and ductility. U.S. Pat. No. 4,716,088 describes the concept of surface roughness and the desirability of in situ surface area formation and particular elements useful for controlling this property. In the Ovonic MgNi based alloys of the present invention, a similar effect (among others) may be achieved by the addition of Group IV elements such as Li, Zn, La, Ce, Pr, Nd, Mm, and F. Mg in the MgNi based alloys is a rather soft inductor metal. The addition of Group IV element(s) imparts a desirable amount of brittleness. In essence, the addition of Group IV element(s) changes the shape of the MgNi based alloy's stress-strain curve or toughness. As a result, when hydrogen is incorporated into the lattice of the alloy during initial charge/discharge cycling, this brittleness results in the formation of a high surface area through the formation of microcracks. This increase in surface area improves the surface catalysis and discharge rate characteristics.

Previous work by the present inventors have described the modification of Ovonic MgNi based alloy materials to produce distinct hydrogen storage alloys. The present invention builds on this work and describes a new concept of combining at least two separate and distinct hydrogen storage alloys to produce non-uniform heterogeneous powder particles. The strategy of combining distinct hydrogen storage alloys permits the formulation of negative electrode materials having a degree of passivation/corrosion optimization (and thus increases in performance) that is significantly greater than any previously formulated metal hydride negative electrode materials.

In this discussion of the invention, heterogeneous powder particles may have two or more separate and distinct hydrogen storage alloys. Such heterogeneous powder particles can specifically include three, four, five, six, . . . (ad infinitum) separate and distinct alloys.

The distinct hydrogen storage alloys of the present invention are not limited to any particular kind of hydrogen storage alloys. The present invention is intended to encompass the combination of separate and distinct hydrogen storage alloys that have been variously described as single phase and multiple phase, crystalline, as well as disordered materials. Such alloys have commonly been referred to by a variety of terms such as Ovonic TiNi, type alloys, Ovonic LaNi$_5$ type alloys, Ovonic MgNi type alloys, etc. Any known type of metal hydride electrochemical material may be used as each of the at least two separate and distinct hydrogen storage alloys that make up the heterogeneous powder particles of the present invention. Preferably, each distinct hydrogen storage alloy can be generally classified as an Ovonic nickel metal hydride as disclosed in U.S. Pat. No. 4,623,597. Specific examples of the separate and distinct Ovonic alloys that can comprise the heterogeneous powder particles of the present the invention include the TiNi type alloys described in U.S. Pat. Nos. 4,551,400; 4,637,967; 4,728,586; 5,096,667; 5,104,617; 5,135,589; 5,238,756; and 5,277,999; as well as the LaNi$_5$ type alloys described in U.S. Pat. Nos. 3,874,928; 4,214,043; 4,107,395; 4,107,405; 4,112,199; 4,125,688; 4,214,043; 4,216,274; 4,487,817; 4,605,603; 4,696,873; 4,699,856 (all of which are discussed in U.S. Pat. No. 5,238,756).

Preferred heterogeneous powder particles of the invention are also formed from at least one Ovonic MgNi based alloy and at least one other separate and distinct hydrogen storage alloy. An example of an Ovonic MgNi based alloy is the following:

$$(Mg_xNi_{1-x})_aM_b$$

where, M represents at least one modifier element chosen from the group consisting of Ni, Co, Mn, Al, Fe, Cu, Mo, W, Cr, V, Ti, Zr, Sn, Th, Si, Zn, Li, Cd, Na, Pb, La, Mm, Pd, Pt, and Ca; b ranges from 0 to less than 30 atomic percent; and a+b=100 atomic percent of the alloy; $0.25 \leq x \leq 0.75$. This alloy is intended to encompass unmodified Mg alloys as well as modified Mg alloys. Such alloys are described in detail in U.S. patent application Ser. No. 08/259,793, the contents of which are incorporated by reference.

In general, one of the separate and distinct hydrogen storage alloys can comprise at least one element chosen from the group consisting of Ti in the amount of 0 to 60 atomic percent; Zr in the amount of 0 to 40 atomic percent; V in the amount of 0 to 60 atomic percent; Ni in the amount of 0 to 57 atomic percent; Cr in the amount of 0 to 56 atomic percent; Cu in the amount of 0 to 56 atomic percent; Co in the amount of 0 to 15 atomic percent; Mn in the amount of 0 to 20 atomic percent; Al in the amount of 0 to 20 atomic percent; Fe in the amount of 0 to 10 atomic percent; Mo in the amount of 0 to 8 atomic percent; La in the amount of 0 to 30 atomic percent; and Mm in the amount of 0 to 30 atomic percent; where the total amount of the components is equal to 100 atomic percent of the alloy.

Such Ovonic hydrogen storage alloys may be one of a variety of known materials such as those described in U.S. Pat. No. 4,849,205, GB 1,571,299, EP 0 484 964, U.S. Pat. No. 5,131,920, EP 0 450 590 A1, and EP 0 484 946A1. Specific examples of compositional formulae of disordered hydrogen storage alloys of the present invention are the following: An alloy represented by the formula ZrMn$_w$V$_x$M$_y$Ni$_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z \leq 2.4$. An alloy in which one of the components La or Ni is substituted by a metal M selected from Groups Ia, II, III, IV, and Va of the Periodic Table of the Elements other than lanthanides, in an atomic proportion which is higher than 0.1% and lower than 25%. An alloy having the formula TiV$_{2-x}$Ni$_x$, where x=0.2 to 0.6. An alloy having the formula Ti$_a$Zr$_b$Ni$_c$Cr$_d$M$_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$. An alloy having the formula ZrMo$_d$Ni$_e$ where d=0.1 to 1.2 and e=1.1 to 2.5. An alloy having the formula Ti$_{1-x}$Zr$_x$Mn$_{2-y-z}$Cr$_y$V$_z$ where $0.05 \leq x \leq 0.4 < y \leq 1.0$, and $0 \leq z \leq 0.4$. An alloy having the formula LnM$_5$ where Ln is at least one lanthanide metal and M is at least one metal chosen from the group consisting of Ni and Co. An alloy comprising at least one transition metal forming 40–75% by weight of the alloy chosen from Groups II, IV, and V of the Periodic System, and at least one additional metal, making up the balance of the alloy, alloyed with the at least one transitional metal, this additional metal chosen from the group consisting of Ni, Cu, Ag, Fe, and Cr—Ni steel. An alloy comprising a main texture of Mm—Ni system; and a plurality of compound phases where each compound phase is segregated in the main texture, and wherein the volume of each of the compound phases is less than about 10 µm$^3$.

Some specific examples of Ovonic hydrogen storage alloys and disordered hydrogen storage alloys are MmNi$_5$, LaNi5, ZrMn$_2$La$_{0.8}$Nd$_{0.2}$Ni$_2$Co$_3$, Ti$_{0.5}$Zr$_{0.5}$Fe$_{0.5}$Ni$_{0.5}$V$_{0.7}$, MmNi$_{3.7}$Mn$_{0.4}$Al$_{0.3}$Co$_{0.6}$, MmNi$_{3.55}$Mn$_{0.2}$Al$_{0.3}$Co$_{0.75}$, Zr$_{0.5}$Ti$_{0.5}$V$_{0.76}$Ni$_{1.48}$Fe$_{0.04}$, Ti$_{0.5}$Zr$_{0.5}$Mo$_{0.2}$CeNi$_{1.2}$V$_{1.8}$, Zr$_{0.9}$Al$_{0.1}$Mn$_{0.5}$Cr$_{0.3}$Ni$_{1.2}$, Ti$_{0.3}$Zr$_{1.0}$Ni$_{1.4}$Cr$_{0.3}$, and Ti$_{0.3}$Cr$_{0.3}$Zr$_{0.5}$Ni$_{0.7}$V$_{1.2}$Cu$_{0.1}$.

The Most preferred heterogeneous powder particles are formed from at least one Ovonic MgNi based alloy (as described in U.S. patent application Ser. No. 08/258,273) and at least one Ovonic TiNi type or LaNi$_5$ type hydrogen storage alloy.

Generally, Ovonic TiNi type hydrogen storage alloys consist of a Base Alloy and modifiers. The preferred formulations of the Base Alloy contain 0.1 to 60 atomic percent Ti, 0.1 to 40 atomic percent Zr, 0 to 60 atomic percent V, 0.1 to 57 atomic percent Ni, and 0 to 56 atomic percent Cr. The most preferred formulations of this Base Alloy contain 0.1 to 60 atomic percent Ti, 0.1 to 40 atomic percent Zr, 0.1 to 60 atomic percent V, 0.1 to 57 atomic percent Ni, and 0 to 56 atomic percent Cr. Specific examples of preferred Ovonic TiNi type hydrogen storage alloys for use as at least one component of the heterogeneous powder particles materials are set forth in Table 3, below.

TABLE 3

1. V$_5$Ti$_9$Zr$_{27}$Ni$_{38}$Cr$_5$Mn$_{16}$
2. V$_5$Ti$_9$Zr$_{27}$Ni$_{38}$Co$_5$Mn$_{16}$
3. V$_5$Ti$_9$Zr$_{26}$Ni$_{38}$Co$_5$Mn$_{16}$Fe$_1$
4. V$_5$Ti$_9$Zr$_{26}$Ni$_{38}$Co$_5$Mn$_{15}$Fe$_2$
5. V$_5$Ti$_9$Zr$_{26}$Ni$_{37}$Co$_5$Mn$_{15}$Fe$_3$
6. V$_5$Ti$_9$Zr$_{26}$Ni$_{36}$Co$_5$Mn$_{15}$Fe$_4$
7. V$_5$Ti$_9$Zr$_{26}$Ni$_{35}$Co$_5$Mn$_{15}$Fe$_5$
8. V$_7$Ti$_9$Zr$_{24}$Ni$_{36}$Co$_5$Mn$_{16}$Fe$_3$
9. V$_6$Ti$_9$Zr$_{28}$Ni$_{35}$Co$_5$Mn$_{15}$Fe$_2$
10. V$_4$Ti$_{10}$Zr$_{29}$Ni$_{35}$Co$_5$Mn$_{15}$Fe$_2$
11. V$_4$Ti$_9$Zr$_{28}$Ni$_{37}$Co$_5$Mn$_{15}$Fe$_2$Sn$_{0.4}$
12. V$_3$Ti$_9$Zr$_{26}$Ni$_{38}$Co$_5$Mn$_{15}$Fe$_2$Sn$_{0.4}$
13. V$_4$Ti$_9$Zr$_{27}$Ni$_{38}$Co$_5$Mn$_{15}$Fe$_2$Sn$_{0.4}$

TABLE 3-continued

14. $V_4Ti_9Zr_{27}Ni_{37}Co_5Mn_{15}Fe_3Sn_{0.4}$
15. $V_3Ti_9Zr_{28}Ni_{37}Co_5Mn_{15}Fe_3Sn_{0.6}$
16. $Ti_{10}Zr_{28}Ni_{36}Co_5Cr_5Mn_{16}$
17. $Ti_{10}Zr_{27}Ni_{36}Co_5Cr_4Mn_{13}Fe_5$
18. $Ti_{12}Zr_{29}Ni_{34}Co_5Cr_5Mn_{15}$
19. $Ti_{13}Zr_{30}Ni_{34}Co_5Cr_3Mn_{15}$
20. $Ti_{12}Zr_{29}Ni_{34}Co_7Cr_1Mn_{15}Fe_2$
21. $V_1Ti_{10}Zr_{28}Ni_{34}Cr_3Co_6Mn_{14}Fe_2$
22. $V_2Ti_{10}Zr_{26}Ni_{34}Cr_3Co_6Mn_{14}Fe_2Sn_1$
23. $V_{0.2}Ti_{10}Zr_{28}Ni_{36}Co_5Cr_5Mn_{16}$
24. $V_{0.2}Ti_{12}Zr_{29}Ni_{34}Co_7Cr_1Mn_{15}Fe_2$
25. $V_{0.5}Ti_{10}Zr_{26}Ni_{34}Co_6Cr_3Mn_{14}Fe_2Sn_2$

The microstructure of the heterogeneous powder particles of the current invention can fall anywhere along the following continuum depending upon the degree of disorder thereof:

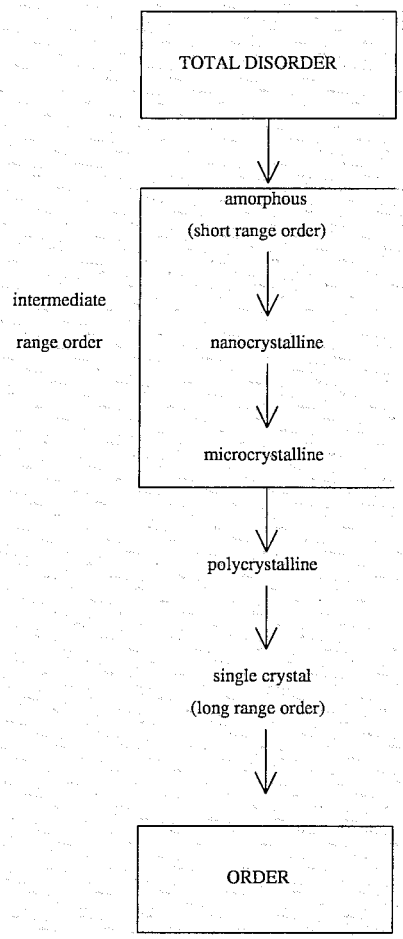

Of course, the microstructure of the heterogeneous powder particles of the present invention can consist of multiple phases of different microstructures such as intermediate range order, as defined in concurrently filed, commonly assigned patent application U.S. patent application Ser. No. 08/436,673 polycrystalline materials in each of the separate and distinct hydrogen storage alloys respectively.

The arrangement of the at least two separate and distinct hydrogen storage alloys of the present invention can be a composite mixture, a lamellar structure, or an encapsulated particle. The desirability of one of these structures over the other is dependent on which at least two separate and distinct hydrogen storage alloys are chosen as the components of the ultimate heterogeneous powder particles. In most cases, a composite mixture, where the quantities of each separate and distinct hydrogen storage alloy are chosen to produce a heterogeneous powder particle having the required amount of passivation and corrosion, as well as other characteristics, is adequate to produce an alloy exhibiting superior electrochemical performance. In other cases, where one of the at least two separate and distinct hydrogen storage alloys has a characteristic, such as catalysis, that gives improved electrochemical performance if placed in intimate contact with a second of the at least two separate and distinct hydrogen storage alloys having a complimentary performance characteristic, such as hydrogen storage, then a lamellar structure is preferable so as to physically juxtapose the storage/catalysis components in close proximity thereby shortening paths of hydrogen solid state diffusion.

Finally, alloy characteristics may warrant the encapsulation of one hydrogen storage alloy by the other. This structure is particularly useful when using magnesium based alloys as a component of the heterogeneous particle. Magnesium based alloys have excellent storage capacity, yet simple or unmodified MgNi based alloys have a tendency to passivate in alkaline electrolyte. Encapsulation is one method of effectively protecting Mg from the corrosive alkaline environment inside an electrochemical cell while still providing for the efficient absorption/desorption of hydrogen.

A preferred encapsulated heterogeneous powder particle uses at least one Ovonic MgNi based alloy encapsulated with at least one Ovonic metal hydride alloy laminating the surface thereof.

One method for forming the heterogeneous powder particles of the present invention is to form one or all of the at least two separate and distinct hydrogen storage alloys using a conventional melt-hydride-grind processes.

Another method is to form one or all of the at least two separate and distinct hydrogen storage alloys using rapid solidification. Rapid solidification refers to methods and processes for rapidly quenching a material from the liquid state into the solid state at a quench rate sufficiently high to freeze the positions of the atoms in their atomic arrangements. Typically, the material is ejected in its liquid state into a high quench environment such as onto a chill wheel where it solidifies before complete crystallization can begin. Generally, the rapid solidification processes are to be contrasted to the thin film deposition processes such as sputtering or vacuum deposition which are conducted at low rates of particle transfer or to a substrate to form a thin film. Preferably, the rapid solidification processes commonly referred to as melt spinning, jet casting, multiple jet casting, or planar flow casting are used. Any of these rapid solidification processes can be used regardless of the particular apparatus used or details of the process itself. In addition, it is possible to introduce chemical and structural disorder on an atomic scale by the use of processing methods such as described in Ovshinsky, et al.'s U.S. Pat. No. 4,339,255 (the contents of which are incorporated by reference). This patent describes rapid quenching multiple streams of material (such as a stream of Base Alloy and a stream of modifier elements) where the flow and quench rate of each stream of material are independently controlled. With respect to the present invention, this technique is particularly useful with modifier(s) of very high melting point or with modifier(s) that are quite different from the host MgNi.

Once the at least two separate and distinct hydrogen storage alloys have been formulated, they may be combined using any fabrication method that effectively permits the retention of their separate and distinct nature. For example, the at least two separate and distinct hydrogen storage alloys may be combined using mechanical alloying, compaction, sintering, or some combination of these methods. It is also foreseeable that the distinct alloys could be combined using some variation of melt spinning or jet casting that would permit the alloys to retain their separate and distinct natures. Mechanical blending or alloying techniques such as ball milling or impact block mixing must be done for a sufficient time to provide electrical connectivity between individual particles. However, these procedures cannot be continued for such a period of time that the separate and distinct nature of the at least two hydrogen storage alloys is destroyed, or that fine powder particle agglomerate together, limiting surface area and catalysis.

EXAMPLES

Thin film materials were prepared in order to rapidly analyze the electrochemical performance characteristics of the combination of separate and distinct alloys of the present invention.

A series of films with different chemical compositions were deposited using laser ablation. Laser ablation was chosen due to its unique capability to transfer target stoichiometry to a substrate. In other words, such a laser technique reduces the effort necessary to balance the chemical composition of the target such as is required with other deposition techniques like sputtering and co-evaporation.

The laser ablation depositions were performed in a four target chamber using a 50 watt exciter laser at 248 nm. The primary target first component material was made by hot-pressing a mixed powder of $Mg_2Ni$, Ni, and Co with a composition of 52 at. % Mg, 45 at. % Ni, 3 at. % Co. The second target of second component material was made from $V_{18}Ti_{15}Zr_{18}Ni_{29}Cr_5Co7Mn_8$ material manufactured by the Ovonic Battery Company as negative electrode material compacted onto a Ni mesh substrate. The deposition parameters for the first component and the second component, respectively, are listed in Table 1.

TABLE 1

|  | First Component | Second Component |
| --- | --- | --- |
| Laser Wavelength | 248 nm | 248 nm |
| Pulse Width | 20 nsec | 20 nsec |
| Pulse Rate | 10 Hz | 10 Hz |
| Laser Fluence | 5 Joule/cm$^2$ | 5 Joule/cm$^2$ |
| Deposition Rate | 1.5 micron/hour | 1.5 micron/hour |
| Deposition Time | 2 hour | 2 hour |
| Background Gas | He | He |
| Background Pressure | 200 mTorr | 200 mTorr |
| Substrate Temperature | 25° C. | 25° C. |
| Substrate | Ni foil | Ni foil |

After the deposition, sample electrochemical cells were prepared using the thin films described in Table 2 as the negative electrode in a oxygen-free flooded cell. The positive electrode was sintered $Ni(OH)_2$. The electrolyte was a 30 wt. % KOH solution. The sample cells were charged using a constant current at a rate of 100 mA/g for 10 hours and discharged at a current of either 100 mA/g or 50 mA/g to 0.9 V with respect to the positive electrode. The measured hydrogen storage capacities for each electrode are listed in Table II. After ten cycles, a significant improvement in capacity was observed. The inventors believe that this increase is due to the presence of the second component Ovonic alloy that encapsulates the Ovonic MgNi based alloy, imparts a significant degree corrosion resistance to the MgNi based alloy and provides an increased number of catalytic sites.

TABLE 2

| substrate | | Capacity (mAh/g) | | | | |
| --- | --- | --- | --- | --- | --- | --- |
| temp during encapsulant deposition | encapsulant thickness | Cycle 1 100 mA/g | Cycle 6 50 mA/g | Cycle 11 50 mA/g | Cycle 16 50 mA/g | Cycle 21 50 mA/g |
| none | none | 406 | 253 | 206 | 179 | 179 |
| 100° C. | 0.5 | 0 | 3 | 6 | 12 | 6 |
| 250° C. | 0.5 | 6 | 18 | 51 | 66 | 21 |
| 400° C. | 0.5 | 163 | 157 | 402 | 378 | 390 |
| 400° C. | 0.5 | 124 | 133 | 326 | 335 | 513 |
| 400° C. | 0.25 | 136 | 230 | 547 | 441 | 607 |
| 400° C. | 0.25 | 130 | 133 | 311 | 302 | 420 |
| 450° C. | 0.5 | 109 | 133 | 320 | 290 | 347 |
| 450° C. | 0.5 | 130 | 145 | 356 | 362 | 465 |

In view of the above, it is obvious to those skilled in the art that the present invention identies and encompasses a range of alloy compositions which, when incorporated as a disordered negative electrode in metal hydride cells, results in batteries having improved electrochemical performance characteristics.

The drawings, discussion, descriptions, and examples of this specification are merely illustrative of particular embodiments of the invention and are not meant as limitations upon its practice. It is the following claims, including all equivalents, that define the scope of the invention.

We claim:

1. Non-uniform heterogeneous composite powder particles for electrochemical uses, where each of said non-uniform heterogeneous composite powder particles comprising at least two separate and distinct hydrogen storage alloys blended together.

2. The non-uniform heterogeneous composite powder particles of claim 1, wherein said non-uniform heterogeneous composite powder particles comprise at least two separate and distinct alloy components when distinguished on the micron level.

3. The non-uniform heterogeneous composite powder particles of claim 2, wherein said non-uniform heterogeneous composite powder particles have a lamellar structure.

4. The non-uniform heterogeneous composite powder particles of claim 1, where one of said at least two separate and distinct hydrogen storage alloys is a Mg based alloy.

5. The non-uniform heterogeneous composite powder particles of claim 1, where a first alloy of said at least two separate and distinct hydrogen storage alloys comprises materials having the following composition:

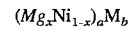

$(Mg_xNi_{1-x})_aM_b$ where,

M represents at least one modifier element chosen from the group consisting of Ni, Co, Mn, Al, Fe, Cu, Mo, W, Cr, V, Ti, Zr, Sn, Th, Si, Zn, Li, Cd, Na, Pb, La, Ce, Pr, Nd, Mm, and Ca;

b ranges from 0 to less than 30 atomic percent; and a+b=100 atomic percent of said first alloy;

$25 \leq s \leq 75$; and where a second alloy of said at least two separate and distinct hydrogen storage alloys comprises components chosen from a group consisting of:
Ti in the amount of 0 to 60 atomic percent;
Zr in the amount of 0 to 40 atomic percent;
V in the amount of 0 to 60 atomic percent;
Ni in the amount of 0 to 57 atomic percent;
Cr in the amount of 0 to 56 atomic percent;
Cu in the amount of 0 to 56 atomic percent;
Co in the amount of 0 to 15 atomic percent;
Mn in the amount of 0 to 20 atomic percent;
Al in the amount of 0 to 20 atomic percent;
Fe in the amount of 0 to 10 atomic percent;
Mo in the amount of 0 to 8 atomic percent;
La in the amount of 0 to 30 atomic percent; and
Mm in the amount of 0 to 30 atomic percent;
where the total amount of said components is equal to 100 atomic percent of said second alloy.

6. Non-uniform heterogeneous composite powder particles for electrochemical uses, said powder particles comprising at least two separate and distinct hydrogen storage alloys where a first alloy of said at least two separate and distinct hydrogen storage alloys comprises materials having the following composition:

$$(Mg_xNi_{1-x})_aM_b$$

where,
M represents at least one modifier element chosen from the
group consisting of Ni, CO, Mn, Al, Fe, Cu, Mo, W, Cr, V, Ti, Zr, Sn,
Th, Si, Zn, Li, Cd, Na, Pb, La, Ce, Pr, Nd, Mm, and Ca;
b ranges from 0 to less than 30, atomic percent; and
a+b=100 atomic percent of said first alloy;
25<x<75; and,
where a second alloys of said at least two separate and distinct hydrogen storage alloys comprises components chosen from a group consisting of;
Ti in the amount of 0 to 60 atomic percent;
V in the amount of 0 to 60 atomic percent;
Zr in the amount of 0 to 40 atomic percent;
Ni in the amount of 0 to 57 atomic percent;
Cr in the amount of 0 to 56 atomic percent;
Cu in the amount of 0 to 56 atomic percent;
Co in the amount of 0 to 15 atomic percent;
Mn in the amount of 0 to 20 atomic percent;
Al in the amount of 0 to 20 atomic percent;
Fe in the amount of 0 to 10 atomic percent;
Mo in the amount of 0 to 8 atomic percent;
La in the amount of 0 to 30 atomic percent; and
Mm in the amount of 0 to 30 atomic percent;
where the total amount of said components is equal to 100 atomic percent of said second alloy; and said second alloy encapsulates said first alloy.

7. The non-uniform heterogeneous composite powder particles of claim 6, where said second alloy is present as intimately mixed striations with said first alloy.

8. The non-uniform heterogeneous composite powder of claim 6, where said powder particles comprise blended composite powder particles of said second alloy and said first alloy.

9. The non-uniform heterogeneous composite powder particles of claim 6, where said powder particles exhibit a preferential distribution of said second alloy on their surface.

10. The non-uniform heterogeneous composite powder particles of claim 5, where said second alloy material comprises a disordered multicomponent material comprising the following components:
Ti in the amount of 0.1 to 60 atomic percent;
Zr in the amount of 0.1 to 25 atomic percent;
V in the amount of 0 to 60 atomic percent;
Ni in the amount of 0.1 to 57 atomic percent;
Cr in the amount of 0.1 to 56 atomic percent;
Co in the amount of 0 to 7 atomic percent;
Mn in the amount of 4.5 to 8.5 atomic percent;
Al in the amount of 0. to 3 atomic percent;
Fe in the amount of 0 to 2.5 atomic percent;
Mo in the amount of 0 to 5.5 atomic percent;
La in the amount of 0 to 30 atomic percent; and
Mm in the amount of 0 to 30 atomic percent;
where the total amount of said components is equal to 100 atomic percent of said second component material.

11. The non-uniform heterogeneous composite powder particles of claim 5, where said second alloy has the following composition:

$$V_{18}Ti_{15}Zr_{18}Ni_{29}Cr_5Co_7Mn_8.$$

12. The non-uniform heterogeneous composite powder particles of claim 5, where said first alloy has the following composition:

$$(base\ Alloy)_aM_b$$

where,
Base Alloy is an alloy of Mg and Ni in a ratio of from about 1:2 to about 2:1;
M represents at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, and Ca;
b is greater than 0.5 atomic percent and less than 30 atomic percent; and
a+b=100 atomic percent of said first component material.

13. A method of making non-uniform heterogeneous composite powder particles for electrochemical hydrogen storage comprising:
forming a first component by mixing and melting where said alloy has the following composition:

$$(Mg_xNi_{1-x})_aM_b$$

where,
M represents at least one modifier element chosen from the group consisting of Ni, Co, Mn, Al, Fe, Cu, Mo, W, Cr, V, Ti, Zr, Sn, Th, Si, Zn, Li, Cd, Na, Pb, La, Ce, Pr, Nd, Mm, and Ca;
b ranges from 0 to less than 30 atomic percent;
a+b=100 atomic percent of said first component material;
25≤x≤75; and
forming a second component comprising at least one element chosen from the group consisting of:
Ti in the amount of 0 to 60 atomic percent;
Zr in the amount of 0 to 40 atomic percent;
V in the amount of 0 to 60 atomic percent;
Ni in the amount of 0 to 57 atomic percent;
Cr in the amount of 0 to 56 atomic percent;

Cu in the amount of 0 to 56 atomic percent;
Co in the amount of 0 to 15 atomic percent;
Mn in the amount of 0 to 20 atomic percent;
Al in the amount of 0 to 20 atomic percent;
Fe in the amount of 0 to 10 atomic percent;
Mo in the amount of 0 to 8 atomic percent;
La in the amount of 0 to 30 atomic percent; and
Mm in the amount of 0 to 30 atomic percent;
where the total amount of said components is equal to 100 atomic percent of said second component material; encapsulating said first component with said second component.

14. The method of making non-uniform heterogeneous composite powder particles for electrochemical hydrogen storage of claim 13, where said second component comprises a disordered multicomponent material comprising the following elements:
Ti in the amount of 0.1 to 60 atomic percent;
Zr in the amount of 0.1 to 25 atomic percent;
V in the amount of 0 to 60 atomic percent;
Ni in the amount of 0.1 to 57 atomic percent;
Cr in the amount of 0.1 to 56 atomic percent:
Co in the amount of 0 to 7 atomic percent;
Mn in the amount of 4.5 to 8.5 atomic percent;
Al in the amount of 0. to 3 atomic percent;
Fe in the amount of 0 to 2.5 atomic percent;
Mo in the amount of 0 to 6.5 atomic percent;
La in the amount of 0 to 30 atomic percent; and
Mm in the amount of 0 to 30 atomic percent;
where the total amount of said elements is equal to 100 atomic percent of said second component.

15. The method of making non-uniform heterogeneous composite powder particles for electrochemical hydrogen storage of claim 13, where said second component comprises an alloy of the following composition:

$V_{18}Ti_{15}Zr_{18}Ni_{29}Cr_5Co_7mn_8.$

16. The method of making non-uniform heterogeneous composite powder particles for electrochemical hydrogen storage of claim 13, where said first component comprises an alloy of the following composition:

(Base Alloy)$_a$M$_b$ where,
Base Alloy is an alloy of Mg and Ni in a ratio of from about 1:2 to about 2:1;
M represents at least one modifier element chosen from the group consisting of Co, Mn, Al, Fe, Cu, Mo, W, Cr, V, Ti, Zr, Sn, Th, Si, Zn, Li Cd, Na, Pb, La, Ce, Pr, Nd, Mm, and Ca;
b is greater than 0.5 atomic percent, and less than 30 atomic percent; and
a+b=100 atomic percent of said first component.

17. A method of making non-uniform heterogeneous composite powder particles for electrochemical hydrogen storage comprising the steps of:
forming a first component having the following composition:

$(Mg_xNi_{1-x})_aM_b$ where,
M represents at least one modifier element chosen from the group consisting of Ni, Co, Mn, Al, Fe, Cu, Mo, W, Cr, V, Ti, Zr, Sn,
Th, Si, Zn, Li, Cd, Na, Pb, La, Ce, Pt, Nd, Mm, and Ca;
b ranges from 0 to less than 30 atomic percent;
a+b=100 atomic percent of said first component material;
$25 \leq x \leq 75$;
forming a second component that is a disordered multicomponent material comprising the following elements:
Ti in the amount of 0.1 to 60 atomic percent;
Zr in the amount of 0.1 to 25 atomic percent;
V in the amount of 0 to 60 atomic percent;
Ni in the amount of 0.1 to 57 atomic percent;
Cr in the amount of 0.1 to 56 atomic percent;
Co in the amount of 0 to 7 atomic percent;
Mn in the amount of 4.5 to 8.5 atomic percent;
Al in the amount of 0. to 3 atomic percent;
Fe in the amount of 0 to 2.5 atomic percent;
Mo in the amount of 0 to 6.2 atomic percent;
La in the amount of 0 to 30 atomic percent; and
Mm in the amount of 0 to 30 atomic percent;
where the total amount of said elements is equal to 100 atomic percent of said second material; and
blending said first component and said second component together by mechanically mixing using ball milling, or impact mixing to form non-uniform heterogeneous powder particles.

18. The method of making non-uniform heterogeneous composite powder particles of claim 17, where said second component comprises an alloy of the following composition:

$V_{18}Ti_{15}Zr_{18}Ni_{29}Cr_5Co_7Mn_8.$

19. The method of making non-uniform heterogeneous composite powder particles of claim 17 where said first component comprises an alloy of the following composition:

(Base Alloy)$_a$M$_b$ where,
Base Alloy is an alloy of Mg and Ni in a ratio of from about 1:2 to about 2:1;
M represents at least one modifier element chosen from the group consisting of Co, Mn, Al, Fe, Cu, Mo, W, Cr, V, Ti, Zr, Sn, Th, Si, Zn, Li. Cd, Na, Pb, La, Ce, Pr, Nd, Mm, and Ca;
b is greater than 0.5 and less than 30 atomic percent; and
a+b=100 atomic percent of said first component material.

20. Non-uniform heterogeneous composite powder particles for use as active material for a nickel metal hydride negative electrode comprising a composite material formed from at least two members selected from the group consisting of single phase TiNi alloys, single phase LaNi$_5$ alloys, single phase Mg base alloys, multiple phase TiNi alloys, and multiple phase LaNi$_5$ alloys, and multiple phase Mg base alloys blended together.

21. The non-uniform heterogeneous composite powder particles of claim 20, where said composite material comprises at least two separate and distinct alloy components when distinguished on the micron level.

22. The non-uniform heterogeneous composite powder particles of claim 20, where said composite material has a lamellar structure.

23. An active material for use as a component of a nickel metal hydride negative electrode comprising:
non-uniform heterogeneous composite powder particles formed by blending together at least two members selected from the group consisting of: single phase TiNi alloys, single phase LaNi$_5$ alloys, single phase Mg base alloys, multiple phase TiNi alloys, and multiple phase LaNi$_5$ alloys, and multiple phase Mg base alloys.

24. The active material of claim 23, where said non-uniform heterogeneous composite powder particles comprise at least two separate and distinct alloy components when distinguished on the micron level.

25. The active material of claim 24, where said non-uniform heterogeneous composite powder particles have a lamellar structure.

26. Non-uniform heterogeneous composite powder particles of electrochemical use, said non-uniform heterogeneous composite powder particles comprising a first blended with and a second component where said first component comprises materials having the following composition:

$$(Mg_xNi_{1-x})_aM_b$$

where,
M represents at least one modifier element chosen from the group consisting of Ni, Co, Mn, Al, Fe, Cu, Mo, W, Cr, V, Ti, Zr, Sn,
Th, Si, Zn, Li, Cd, Na, Pb, La, Ce, Pt, Nd, Mm, and Ca;
b ranges from 0 to less than 30 atomic percent; and
a+b=100 atomic percent of said first component;
$25 \leq x \leq 75$; and
said second component comprises at least one element chosen from the group consisting of:
Ti in the amount of 0 to 60 atomic percent;
Zr in the amount of 0 to 40 atomic percent;
V in the amount of 0 to 60 atomic percent;
Ni in the amount of 0 to 57 atomic percent;
Cr in the amount of 0 to 56 atomic percent;
Cu in the amount of 0 to 56 atomic percent;
Co in the amount of 0 to 15 atomic percent;
Mn in the amount of 0 to 20 atomic percent;
Al in the amount of 0 to 20 atomic percent;
Fe in the amount of 0 to 10 atomic percent;
Mo in the amount of 0 to 8 atomic percent;
La in the amount of 0 to 30 atomic percent; and
Mm in the amount of 0 to 30 atomic percent;
where the total amount of said elements is equal to 100 atomic percent of said second component.

27. The non-uniform heterogeneous composite powder particles of claim 26, where said second component encapsulates said first component.

28. The non-uniform heterogeneous composite powder particle of claim 26, where said second component is present as intimately mixed striations of said first component.

29. The non-uniform heterogeneous composite powder particles of claim 26, where said powder particles comprise blended composite powder particles of said second component and said first component.

30. The non-uniform heterogeneous composite powder particles of claim 26, where said non-uniform heterogeneous composite powder particles exhibit a preferential distribution of said second component on their surface.

31. The non-uniform heterogeneous composite powder particles of claim 26, where said second component comprises a disordered multicomponent material comprising the following elements:
Ti in the amount of 0.1 to 60 atomic percent;
Zr in the amount of 0.1 to 25 atomic percent;
V in the amount of 0 to 60 atomic percent;
Ni in the amount of 0.1 to 57 atomic percent;
Cr in the amount of 0.1 to 56 atomic percent;
Co in the amount of 0 to 7 atomic percent;
Mn in the amount of 4.5 to 8.5 atomic percent;
Al in the amount of 0. to 3 atomic percent;
Fe in the amount of 0 to 2.5 atomic percent;
Mo in the amount of 0 to 6.5 atomic percent;
La in the amount of 0 to 30 atomic percent; and
Mm in the amount of 0 to 30 atomic percent;
where the total amount of said elements is equal to 100 atomic percent of said second component.

32. The non-uniform heterogeneous composite powder particles of claim 26, where said second component comprises an alloy of the following composition:

$$V_{18}Ti_{15}Zr_{N/29}Cr_5Co_7Mn_8.$$

33. An electrochemical hydrogen storage cell comprising:
non-uniform heterogeneous composite powder particles for electrochemical hydrogen storage comprising:
a first component comprising materials having the following composition:

$$(Mg_xNi_{1-x})_aM_b$$

where,
M represents at least one modifier element chosen from the group consisting of Ni, Co, Mn, Al, Fe, Cu, Mo, W, Cr, V, Ti, Zr, Sn,
Th, Si, Zn, Li, Cd, Na, Pb, La, Ce, Pr, Nd, Mm, and Ca;
b ranges from 0 to less than 30 atomic percent; and
a+b=100 atomic percent of said first component material;
$25 \leq x23\ 75$; blended with
a second component comprising at least one element chosen from the group consisting of:
Ti in the amount of 0 to 60 atomic percent;
Zr in the amount of 0 to 40 atomic percent;
V in the amount of 0 to 60 atomic percent;
Ni in the amount at 0 to 57 atomic percent;
Cr in the amount of 0 to 5 atomic percent;
Cu in the amount of 0 to 56 atomic percent;
Co in the amount of 0 to 15 atomic percent;
Mn in the amount of 0 to 20 atomic percent;
Al in the amount of 0 to 20 atomic percent;
Fe in the amount of 0 to 10 atomic percent;
Mo in the amount of 0 to 8 atomic percent;
La in the amount of 0 to 30 atomic percent; and
Mm in the amount of 0 to 30 atomic percent;
where the total amount of said elements is equal to 100 atomic percent of said second component.

34. The method of making non-uniform heterogeneous composite powder particles for electrochemical hydrogen storage of claim 13, where said encapsulating step is accomplished using a method chosen from a group consisting of melt spinning, gas atomization, ultrasonic atomization, centrifugal atomization, planar flow casting, plasma spray, mechanical alloying, and vapor deposition.

* * * * *